United States Patent [19]

Blastic

[11] 4,157,152

[45] Jun. 5, 1979

[54] GOLF SCORE CARD AND PENCIL HOLDER

[76] Inventor: Douglas V. Blastic, 115 Princeton La., Logansport, Ind. 46947

[21] Appl. No.: 786,661

[22] Filed: Apr. 11, 1977

[51] Int. Cl.[2] .............................................. B60R 11/00

[52] U.S. Cl. ................................ 224/247; 24/11 PP; 24/81 PC; 24/84 R; 224/274

[58] Field of Search ................ 224/25 R, 28 D, 29 A, 224/29 B, 29 G, 29 M, 42.45 R, 42.46 R, 5 R, 5 C; 24/10 R, 11 R, 11 CC, 11 HC, 11 PP, 81 B, 81 PC, 81 PH, 84 R; 273/32 R, 32 B

[56] References Cited

U.S. PATENT DOCUMENTS

| | | | |
|---|---|---|---|
| D. 165,253 | 11/1951 | Ward | 224/5 C X |
| 1,506,245 | 8/1926 | Lyman | 24/11 PP |
| 1,815,024 | 7/1931 | Foster | 24/81 PC X |
| 1,973,819 | 9/1934 | Link | 224/5 C X |
| 2,549,200 | 4/1951 | Hooks | 224/29 A X |
| 2,658,773 | 11/1953 | Tarris | 24/81 PC X |
| 2,682,981 | 8/1954 | Previdi | 224/5 R |
| 2,802,250 | 8/1957 | Klotz | 24/11 PP X |
| 3,010,628 | 11/1961 | Kowalczyk | 224/29 B |
| 3,083,427 | 4/1963 | Grenon | 24/84 R |

FOREIGN PATENT DOCUMENTS 24895 of 1910 United Kingdom .................. 24/11 PP

*Primary Examiner*—Trygve M. Blix
*Assistant Examiner*—Winston H. Douglas
*Attorney, Agent, or Firm*—Gust, Irish, Jeffers & Rickert

[57] ABSTRACT

An accessory for a golf player, in order to keep and record his playing score, the device including a stiff panel having a leaf spring mounted on its one end, one end of the leaf spring being turned under the panel to form a hook for attachment over a top of a golf bag, the other end of the leaf spring extending over the top of the panel, and serving to hold a score card securely against the panel, and, the same end of the leaf spring including a hook-shaped tab under which a pencil can be removably held.

3 Claims, 7 Drawing Figures

10
11
12
13
13
14
15
16
19

10
11
12
13
16
19

10
11
13
14
16
17
18
19
20

10
11
12
14

22
26
30
32
33

21
22
22
23
24
25
26
27
28
29
30
31

11
21
22

GOLF SCORE CARD AND PENCIL HOLDER

This invention relates generally to accessories for golf players. More specifically, it relates to writing boards.

A principal object of the present invention is to provide a golf score card and pencil holder, upon which a score card and a writing implement are conveniently supported, so a player can easily keep track of his score, and the holder being readily attachable to a top of a golf bag one carries, which is more desirable than carrying a card and separate pencil in a person's pocket.

Another object of the present invention is to provide a golf score card and pencil holder, which presents a firm writing surface, so that writing may be more legible, than if made upon an unsupported card.

Other objects are to provide a golf score card and pencil holder, which is simple in design, inexpensive to manufacture, rugged in construction, easy to use and efficient in operation.

These, and other objects, will be readily evident, upon a study of the following specification and accompanying drawing, wherein.

Figures 1, 2, 3, 4, 5, 6, 7:
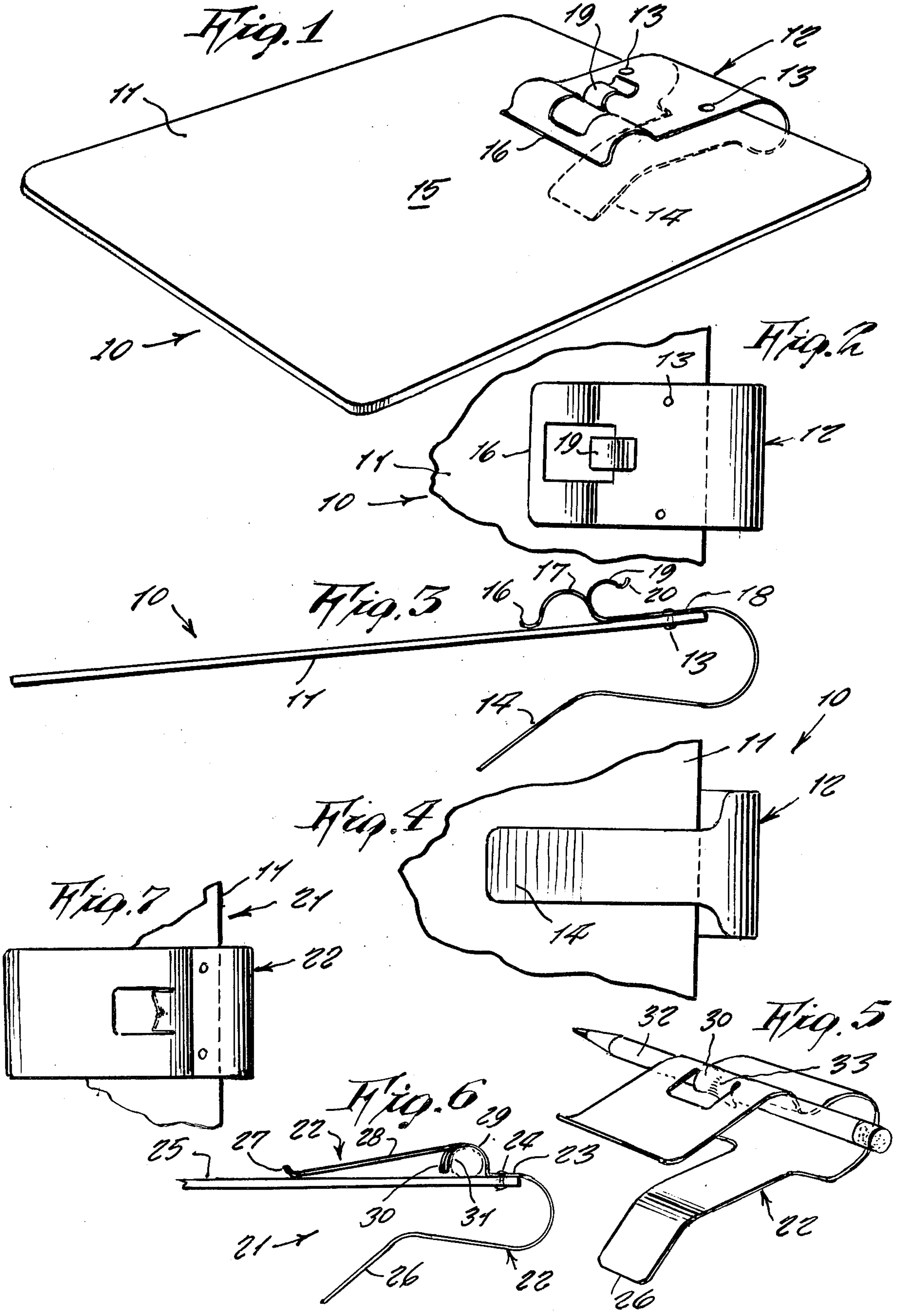
FIG. 1 is a perspective view of one design of the invention.
FIG. 2 is a top view thereof, shown fragmentarily.
FIG. 3 is a side view.
FIG. 4 is a bottom view, shown fragmentarily.
FIG. 5 is a perspective view of another design of the invention.
FIG. 6 is a side view thereof.
FIG. 7 is a top view thereof.

Referring now to the drawing in greater detail, and more particularly to FIGS. 1 through 4 thereof at this time, the reference numeral 10 represents a golf score card and pencil holder, according to the present invention, wherein there is a stiff flat panel 11, made of plastic, and which measures approximately four inches by six inches, and which is approximately 0.075 inch thick. A leaf spring 12 is secured on one end of the panel, by means of a pair of rivets 13. One end of the leaf spring is bent underneath the panel, as as to form a hook 14, in order that the device may be hooked around the top of a golf bag, for purpose of support.

The opposite end of the spring clip rests against the upper surface 15 of the panel, and includes an upwardly rounded lip 16, so that an edge of a playing card can be pushed under the lip, and thus held securely upon the panel. The lip is formed on the end of an upwardly rounded, generally semi-cylindrical, transverse extending portion 17, which, at its other end, is adjacent a flat portion 18, through which the rivets 13 extend. In the present invention, the portion 17 has a struck-out tab 18, made therefrom, and which is turned to extend in spaced relation above the flat portion 18, in order to form a hook, in which a pencil can be clipped. The terminal edge of the tab is upwardly rounded, as shown at 20, so a pencil can be easily introduced under the rounded tab, and from which it can be easily removed for use.

In operative use, it is now evident that a score card can be placed upon the top of the panel, and secured under the lip 16 of the leaf spring. A pencil can then be removed from under the tab 19, in order to be used as a writing implement, for keeping a score on the score card. After a score entry is made upon the card, the pencil is simply clipped back under the tab, and the holder is then hooked over the top of the golf bag. Thus, it can be easily carried across a golf course.

Referring now to FIGS. 5 through 7, a modified design of golf score card and pencil holder 21 is shown, which includes the panel 11 and a leaf spring 22. In this design, the leaf spring has a transverse extending flat central portion 23, through which rivets 24 extend, for securement upon the upper surface 25 of the panel. One end of the leaf spring extends under the panel in spaced relation, so as to form a hook 26, for support of the device upon a top of a golf bag.

The opposite end of the leaf spring includes an upwardly turned lip 27, adjacent a straight portion 28, extending angularly respective to the panel, and which at its opposite end is adjacent a rounded portion 29, which is adjacent one end of the flat portion 23. A tab 30, struck out in the straight portion 28, is downwardly rounded in a direction toward the upper surface 25 of the panel, and which, together with the portion 29, forms a semi-cylindrical clip 31, under which a pencil 32 is securable. As clearly shown, the tab 30 is quadricylindrical in shape, except that at its center, it has an inward bulge 33, so as to bind hard against the pencil 32. Such central binding surface against the pencil, accordingly, permits the two opposite ends of the tab to be rounded outwardly, as is clearly evident in FIG. 5, so that a pencil can be easily inserted under the tab from either end. The advantage of this design is that the pencil supporting the tab is thus located under the clip, so as not to protrude, and get caught on any other objects.

While various changes may be made in the detail construction, it is understood that such changes will be within the spirit and scope of the present invention, as is defined by the appended claims.

What I now claim is:

1. A golf score card and pencil holder, comprising, in combination, a flat stiff panel and a generally U-shaped single piece leaf spring being placed around one end of said panel and having one leg on one side of said panel and the other leg on the other side of said panel; said one leg being secured upon said one end of said panel; one end of said other leg of said leaf spring being rounded and turned in toward the other side of said panel in spaced-apart relation with said other side of said panel, forming a resilient hook for support upon the top edge of a golf bag; the end of said one leg including a lip turned upon its terminal edge so a score card can be resiliently held between said end of said one leg and said one side of said panel; and said one leg of said leaf spring incorporating means for removably and resiliently supporting a writing pencil, said pencil supporting means comprising a rounded tab struck-out centrally from and spaced adjacently to the end of said one leg for resilient and removable retention of a writing pencil, said single piece leaf spring thereby providing a spring force for resilient and removable retention of a score card and a pencil and for resilient mounting to a golf bag top edge.

2. The combination as set forth in claim 1 wherein said end of said one leg has an arcuately formed section adjacent said lip to provide an arcuate spring arm acting against said one side of said panel for resilient and removable retention of a score card and has a flat section between said arcuate section and said one end of said panel; said flat section being substantially contiguous with said one surface of said panel; said tab being struck-out from said arcuate section and being rounded away from said panel to form a hook under which said pencil is resiliently and removably retained.

3. The combination as set forth in claim 1, wherein said one end of said one leg is arcuately formed upwardly from said panel adjacent said one end of said panel to define a wedge shaped space between said end of said one leg and said one side of said panel, said struck-out tab being downwardly rounded into said space for hooking around said pencil so that said pencil is resiliently and removably held in said space adjacent said one side of said panel between the underside of said struck-out tab and said one side of said panel; said struck-out tab having a radially inward bulge at its center resiliently bearing against a side of said pencil.

* * * * *